May 29, 1934.  C. B. DREYER  1,960,373
ART OF CINEMATOGRAPHY
Filed July 5, 1933

Inventor
Charles B. Dreyer
By Lyon & Lyon
Attorneys

Patented May 29, 1934

1,960,373

UNITED STATES PATENT OFFICE 1,960,373

ART OF CINEMATOGRAPHY

Charles B. Dreyer, Los Angeles, Calif., assignor of one-half to Henry F. Boeger, Los Angeles, Calif.

Application July 5, 1933, Serial No. 679,037

5 Claims. (Cl. 95—5)

This invention relates to a method of producing monochromatic cinematographic films which contain images of objects photographed in such relation that an effect of relief or depth is obtained. Generally stated, the method contemplates the simultaneous recording of two images of a single object on a continuous film provided with an emulsion on either side thereof, the images recorded in the one of such emulsions being extremely sharp and critical whereas the images recorded in the other emulsion are diffused. Both emulsions of such film are then developed simultaneously and are then printed upon a single coated positive continuous film, a record being thus obtained of both images recorded on the negative.

The invention also contemplates a method of controlling or contrasting the density of the finished positive film and a method whereby the amount or character of the diffusion in one of the images carried by the negative film may be controlled by changing the character of the illumination used on the object being photographed. Such control over the amount or character of the diffusion permits the creation of relief or stereoscopic effects.

It is an object of this invention to disclose and provide a method of producing positive monochromatic motion picture film carrying images which give rise to a sterescopic effect when projected, in a simple and facile manner.

Another object is to disclose and provide a method of producing monochromatic motion picture film in which the images exhibit relief and roundness or depth without the necessity of using special cameras or projectors.

A further object of this invention is to disclose and provide a method whereby a critically sharp image and a diffused or rounded image may be simultaneously obtained from a single object in a single photographic step.

A still further object is to disclose and provide a method whereby the relief characteristics or degree of relief exhibited in the positive film may be controlled by varying the illumination on the objects being photographed. Such control of illumination permits placing any desired portion of the object or scene being photographed into relief.

These and other objects, uses and advantages of the invention, as well as modifications and adaptations thereof, will become apparent to those skilled in the art from the following detailed description of a preferred method of putting the invention in operation.

In describing the invention, reference will be had to the appended drawing, in which Fig. 1 is a diagrammatic plan view illustrating a typical arrangement of elements employed during photography in accordance with this invention.

It has been discovered that the effect of depth or relief may be obtained by utilizing two separated layers of emulsion in a negative film, such layers of emulsion being separated by a substance having a suitable index of refraction whereby one image recorded in one of said emulsions is maintained sharp, whereas the other image is diffused. Furthermore, it has been discovered that the production of the two simultaneous negative images is facilitated by employing emulsions differing in sensitivity to lights of different wave length, both of said emulsions, however, having substantially the same developing characteristics.

Figure 2:
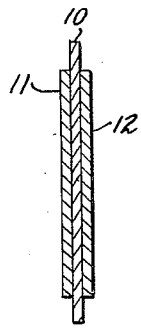
Fig. 2 is an enlarged longitudinal section through a portion of negative film utilized during photography.

It has also been found that all of the requirements referred to hereinabove may be fulfilled in a single continuous film of the character diagrammatically illustrated in Fig. 2, wherein a supporting strip, indicated at 10, is provided with an emulsion coating on either side thereof. One of said emulsion coatings is indicated at 11 whereas the other is indicated at 12. The supporting strip 10 may consist of any flexible, substantially transparent substance having a desired index of refraction such as, for example, celluloid or other nitrocellulose product. When celluloid is used, its thickness should be between 0.005 and 0.007 inches.

The emulsions 11 and 12 may be of the same general type, for example of the panchromatic type. Preferably, however, the emulsion 11 is most sensitive to light of shorter wave lengths whereas the emulsion 12 is most sensitive to the longer wave lengths of light. The emulsion 11, for example, may be sensitive to light down to the yellow whereas the emulsion 12 may be most sensitive to orange and red.

Figure 1:
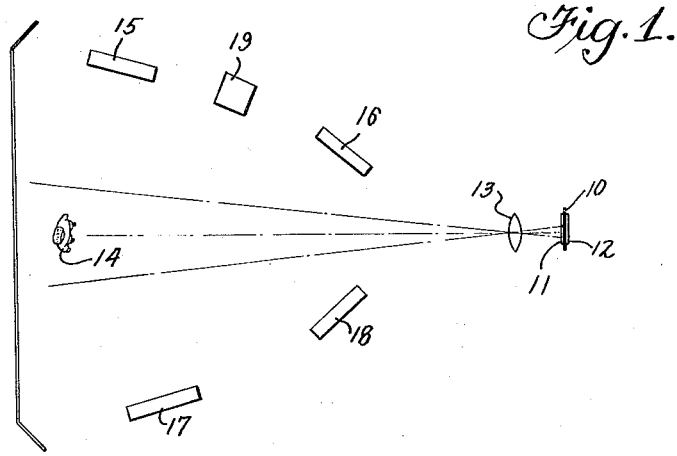

In utilizing the negative film described hereinabove, the emulsion most sensitive to the shorter wave lengths of light, namely, the emulsion 11, preferably faces the lens and the object being photographed, as indicated in Fig. 1, wherein the lens of the camera is diagrammatically illustrated at 13 and the object at 14. The object may be illuminated in any suitable manner as, for example, by means of light sources 15, 16, 17 and 18. High lighting may be effected by means of separate light sources, such as one indicated at 19. When it is desired to accentuate the high lighting on the object being photographed, the longer wave lengths of light are employed and therefore the light source 19 may be provided with a color filter so as to cause an orange or red light upon the object 14.

The photographing operation is then carried out in the normal manner and two simultaneous images are obtained during every photographic exposure of the film in the camera, one of the images being recorded on the emulsion 11 and the other on the emulsion 12. The emulsion 11 lies in the focal plane and a critical image of great definition is obtained. The light passing through the emulsion 11 is partially refracted by the carrier or support 10 and gives rise to a diffused image in the emulsion 12.

During photography, the amount of diffusion and the intensity of the image recorded in the emulsion 12 is preferably controlled by varying the character of the illumination used on the object 14, as stated hereinabove, for example when it is desirable to accentuate the high lights. The light used for this purpose includes a large proportion of those rays to which the emulsion 12 is most sensitive, for example the orange or red. In this manner, both the amount of diffusion and the density of the image in emulsion 12 is accentuated. In the event the light source 19 were to emit light of short wave length, such as for example the blue, the amount of diffusion would be substantially the same although the contrast would not be as great. Under such conditions, the prints resulting from images thus obtained would be sharp but lacking in contrast and that degree of relief which is obtained where the foreground or primary object is illuminated with light of both long and short wave lengths, while the background or secondary object is concurrently illuminated with light to which only one of the two emulsions carried by the film 10 is preferentially sensitive.

Figure 3:
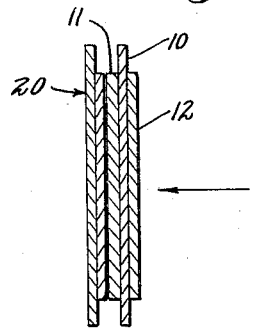
Fig. 3 is an enlarged longitudinal section showing the relationship between the developed negative film and a positive film during printing.

The exposed negative film obtained as above described may then be developed in the normal manner, it being remembered that the two emulsions on the carrier preferably have the same developing characteristics. After washing and drying, the negative film may be printed upon a normal single-coated positive film in the manner illustrated in Fig. 3. As there shown, the now developed negative film (component parts of which being represented by the same numbers as those used in Fig. 2) is brought in contact with a positive film 20, the emulsion 11 bearing the sharp or critical image being brought in contact with the emulsion of the positive film 20. Printing light is passed through the two films in the direction indicated by the arrow, whereupon both the sharp image of emulsion 11 and the diffused image of emulsion 12 are simultaneously printed upon the positive.

Upon developing the positive film and projecting the same in the normal manner, it will be found that the projected images exhibit relief or depth which strikingly simulates true stereoscopic reliefs.

All such changes and modifications as come within the scope of the appended claims are embraced thereby.

I claim:

1. In monochromatic motion picture photography, the steps of: providing a single negative film comprising two emulsions spaced with a substantially transparent refractive substance, one of said emulsions being preferentially sensitive to light of orange and longer wave lengths, the other of said emulsions being preferentially sensitive to light shorter in wave length than orange; positioning said film with the emulsion preferentially sensitive to shorter wave lengths facing the scene to be photographed, focusing the scene to be photographed on the emulsion facing said scene, photographing the scene on the said film to simultaneously form two images on the two spaced emulsions and lighting portions of the scene which it is desired to relieve with light both longer and shorter than orange while lighting the remainder of the scene with light to which only one of the emulsions is preferentially sensitive so as to form a sharp image in the emulsion facing the scene and a diffused image in the emulsion away from the scene; developing both images on the film at the same time, and then printing both images upon a single coated positive film.

2. In a process as defined in claim 1, the step of controlling the amount of diffusion and the intensity of the image recorded in the emulsion facing away from the object by regulating the wave length of illumination used on the object.

3. In monochromatic motion picture photography, the steps of: providing a single negative film comprising two emulsions spaced with a substantially transparent refractive substance, one of said emulsions being preferentially sensitive to light of orange and longer wave lengths, the other of said emulsions being preferentially sensitive to light shorter in wave length than orange; positioning said film with the emulsion preferentially sensitive to shorter wave lengths facing the scene to be photographed; focusing the scene to be photographed on the emulsion facing said scene; photographing the scene on the said film to simultaneously form two images on the two spaced emulsions; illuminating substantially all portions of the scene during photography with light shorter in wave length than orange and simultaneously illuminating the portion of the scene which it is desired to accentuate and place in relief with light of orange and longer wave lengths; developing both images recorded on the film at the same time, and then printing both images upon a single coated positive film.

4. In monochromatic motion picture photography, the steps of: photographing a scene upon a single negative provided with two spaced emulsions, one of said emulsions being preferentially sensitive to light of orange and longer wave lengths, the other of said emulsions being preferentially sensitive to light shorter in wave length than orange, the emulsion preferentially sensitive to shorter wave lengths facing the scene to be photographed, the scene to be photographed being focused on the emulsion facing said scene, illuminating substantially all portions of the scene during photography with light shorter in wave length than orange and illuminating the portion of the scene which it is desired to accentuate and place in relief with light of orange and longer wave lengths; developing both images recorded on the film at the same time, and then printing both images on a single-coated positive film.

5. In a process as defined in claim 4, the step of controlling the amount of diffusion and the intensity of the images recorded on the emulsions by regulating the wave length of the illumination used on the object being photographed.

CHARLES B. DREYER.